United States Patent [19]
Kobayashi et al.

[11] Patent Number: 6,064,835
[45] Date of Patent: May 16, 2000

[54] FIELD FRAME FOR FINDER

[75] Inventors: Kiyotaka Kobayashi; Toshihiko Izaki; Hiroshi Sohma; Yukitaka Takeshita, all of Saitama-ken, Japan

[73] Assignee: Fuji Photo Film Co., Ltd., Kanagawa-ken, Japan

[21] Appl. No.: 08/114,094

[22] Filed: Aug. 31, 1993

[30] Foreign Application Priority Data

Sep. 1, 1992 [JP] Japan .................................. 4-233868

[51] Int. Cl.[7] .................................................. G03B 17/00
[52] U.S. Cl. ...................... 396/435; 354/222; 354/159; 354/106
[58] Field of Search ................... 354/222, 159, 354/106

[56] References Cited

U.S. PATENT DOCUMENTS

| | | | |
|---|---|---|---|
| 3,033,072 | 5/1962 | Miller et al. | 354/222 |
| 4,119,983 | 10/1978 | Tanaka | 354/222 |
| 4,973,997 | 11/1990 | Harvey | 354/222 |
| 5,325,140 | 6/1994 | Torikoshi et al. | 354/159 |
| 5,344,730 | 9/1994 | Kitamoto | 354/106 |
| 5,345,285 | 9/1994 | Hasushita et al. | 354/159 |

Primary Examiner—David M Gray
Attorney, Agent, or Firm—Young & Thompson

[57] ABSTRACT

A field frame for use with a finder which provides arbitrary or stepwise switches of an aspect ratio of the finder. The field frame is made up of a standard field frame, a first L-shaped field switch frame having a dowel pin and two elongated holes, and a second L-shaped field switch frame having a dowel pin and two elongated holes. These two L-shaped field switch frames are piled up one on top of the other in such a manner that dowel pins standing on the main body of the standard field frame fit into the laminated elongated holes of the L-shaped field switch frames. A driving wheel having engaging cutouts is also laminated on the L-shaped field switch frames so that the engaging cutouts can engage with the dowel pins of the field switch frames. The driving wheel is also provided with a lever. The clockwise rotation of the driving wheel causes the field switch frames to conceal the right and left edges of the standard field frame, whilst the counterclockwise rotation of the driving wheel causes the field switch frames to conceal the upper and lower edges of the standard field frame.

6 Claims, 4 Drawing Sheets

FIELD FRAME FOR FINDER

BACKGROUND OF THE INVENTION

1. Field of the Invention

This invention relates to a field frame for use with a finder.

2. Description of the Prior Art

A visual field of known finders is only switched between a standard aspect ratio and another specific aspect ratio.

SUMMARY OF THE INVENTION

The object of this invention is to provide a field frame for use with a finder which is capable of switching its aspect ratio arbitrarily or stepwise.

To this end, according to one aspect of this invention, the present invention provides a field frame comprising:

a reference field frame with its center arranged in line with an optical axis;

at least two L-shaped field switch means which are movably arranged opposite to each other with respect to the optical axis; and a driving means for displacing the L-shaped field switch means relatively to each other so that the combination of the L-shaped field switch means can produce a rectangular space by the inner-angles of the L-shaped field switch means, whereupon a part of the visual field of the reference field frame is laterally or longitudinally concealed by the presence of the rectangular space, whereby an aspect ratio of the field frame can be changed.

In one preferred mode of this invention, each of the L-shaped field switch means has a dowel pin and two elongated holes; the main body of the reference field frame has two dowel pins; and the L-shaped field switch means are superposed on the reference field frame in such a manner that the dowel pins of the reference field frame are inserted into the laminated elongated holes.

In accordance with one preferred mode of this invention, the driving means is a wheel having one lever and two engaging cut-outs which engage the dowel pins of the L-shaped field switch means, so that the rotation of the wheel can cause the L-shaped field switch means to longitudinally or laterally conceal a part of the visual field of the reference frame, whereby the aspect ratio of the field frame can be changed arbitrarily.

In accordance with another preferred mode of this invention, the driving means is a wheel having one notched lever and two engaging cutouts which engage the dowel pins of the L-shaped field switch means, and the field frame further includes a latch which engages one of a plurality of engaging notches formed on the notched lever, so that the engagement of the latch with one of the notches can cause the L-shaped field switch means to longitudinally or laterally conceal a part of the visual field of the reference frame, whereby the aspect ratio of the field frame can be changed stepwise.

DETAILED DESCRIPTION OF THE PREFERRED EMBODIMENTS

With reference to the accompanying drawings, preferred embodiments of this invention will now be described in detail.

By way of an example, an actual image finder is referred to in one embodiment of this invention. As a matter of course, the present invention will never be limited to this embodiment.

Figure 1:
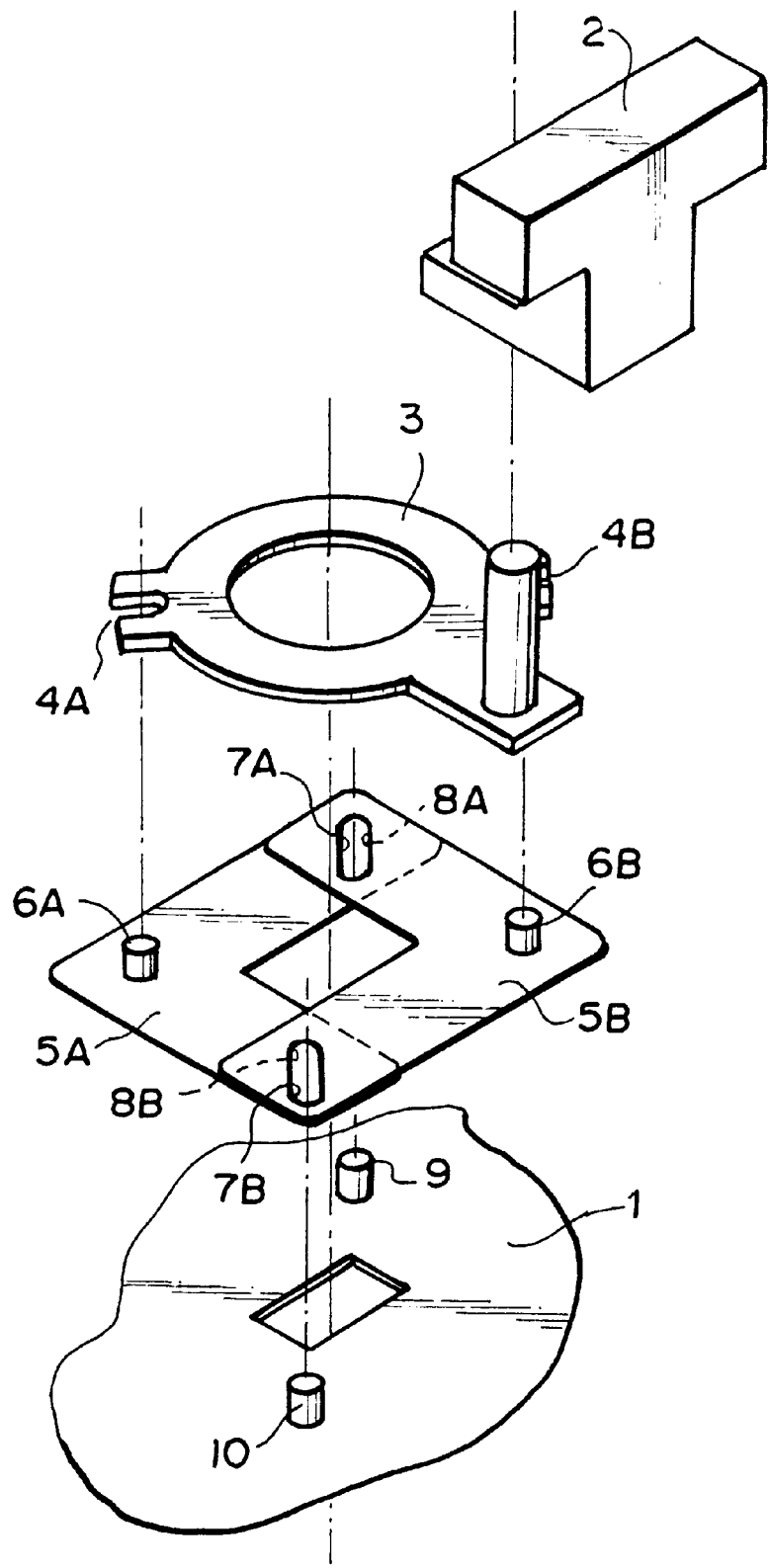
FIG. 1 is an exploded view showing constituent components of a field frame for use with a finder according to a first embodiment of this invention.

FIG. 1 is an exploded view showing constituent components of a field frame for use with a finder according to one embodiment of this invention. An L-shaped field switch frame 5A having a dowel pin 6A and elongated holes 8A and 8B and an L-shaped field switch frame 5B having a dowel pin 6B and elongated holes 7A and 7B are superposed on a standard field frame 1 in such a manner that dowel pins 9 and 10 projecting from the body of the frame 1 are inserted into a pair of the elongated holes 7A and 8A and another pair of the elongated holes 7B and 8B, respectively. A driving wheel 3 having engaging cutouts 4A and 4B is also superposed on the field switch frames so that the engaging cutouts 4A and 4B can engage with the dowel pins 6A and 6B. The driving wheel 3 is provided with a lever 2.

Figure 2:
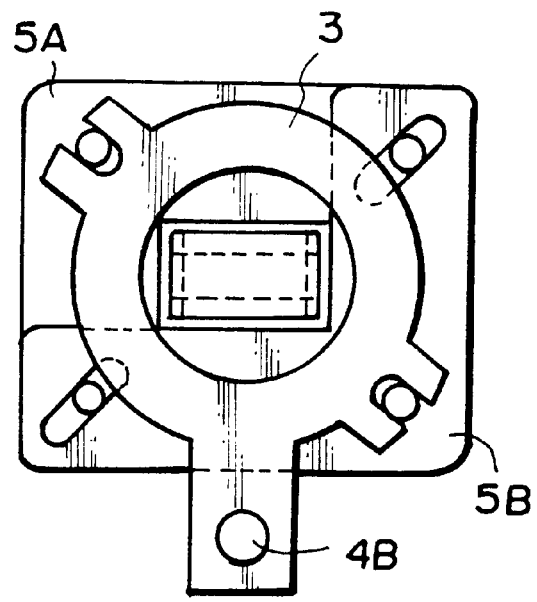
FIG. 2 is a plan view showing a position where a standard field frame remains unconcealed by field switch frames.
Figure 3:
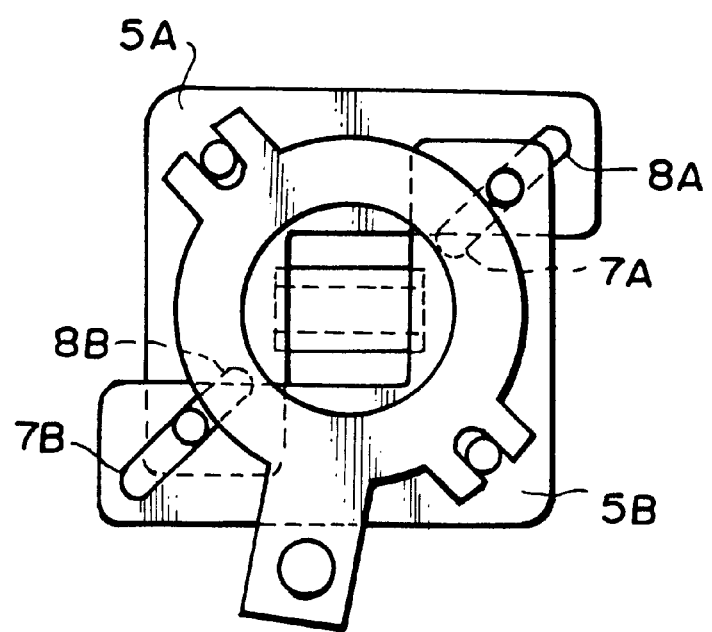
FIG. 3 is a plan view showing a position where the right and left edges of the standard field frame are concealed by the field switch frames.
Figure 4:
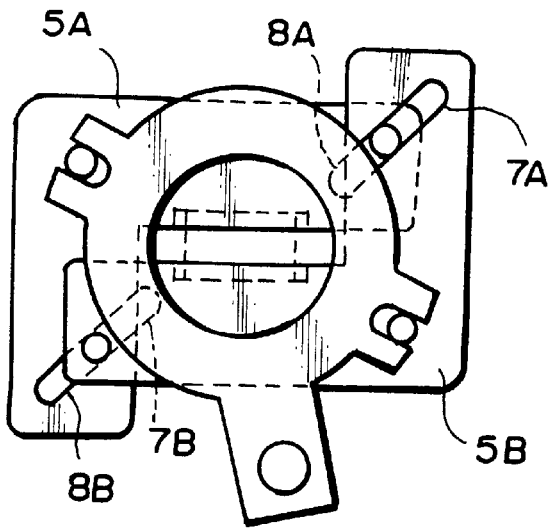
FIG. 4 is a plan view showing a position where the upper and lower edges of the standard field frame are concealed by the field switch frames.

Referring to FIGS. 1 through 4, the operation of the field frame for use with the finder having the foregoing structure will now be described. FIG. 2 is a plan view showing a position wherein a standard field frame remains unconcealed by the field switch frames; FIG. 3, a plan view showing a position wherein the right and left edges of the standard field frame are concealed by the field switch frames; and FIG. 4, a plan view showing a position wherein the upper and lower edges of the standard field frame are concealed by the field switch frames.

The standard field frame 1 is arranged in an image producing plane. For a standard aspect ratio, the L-shaped field switch frames 5A and 5B are retracted to a position wherein the standard field frame 1 remains unconcealed by the field switch frames. When the field frame switch lever 2 is laterally displaced, the driving wheel 3 is rotated around an optical axis in accordance with the lateral displacement of the switch lever 2. As mentioned above, the field switch frames 5A and 5B are provided with the dowel pins 6A and 6B and the elongated holes 7A, 7B, 8A and 8B. The dowel pins 6A and 6B engage with the engaging cutouts 4A and 4B of the driving wheel 3, and the dowel pins 9 and 10 engage with the elongated holes 7A, 7B, 8A and 8B which project from the main body of the field frame 1. Hence, the rotation of the driving wheel 3 causes the field switch frames 5A and 5B to conceal either the upper and lower edges or the right and left edges of the standard field frame 1, whereby an aspect ratio of the visual field of the finder is changed. In this embodiment, the clockwise rotation of the driving wheel 3 causes the field switch frames 5A and 5B to conceal the right and left edges of the standard field frame 1, whilst the counterclockwise rotation of the driving wheel 3 causes the field switch frames 5A and 5B to conceal the upper and lower edges of the standard field frame 1.

Figure 5:
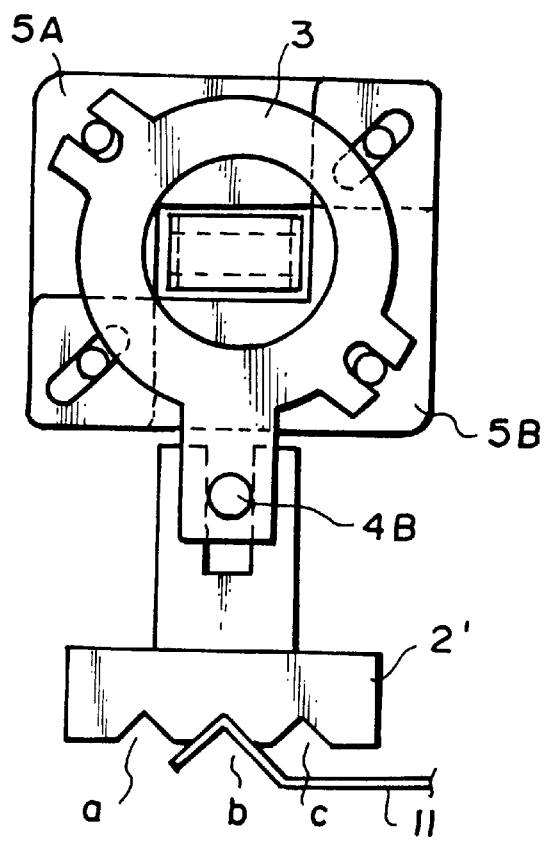
FIG. 5 is a plan view showing another embodiment of a field frame according to this invention.

FIG. 5 illustrates another embodiment of a field frame for use with a finder according to the present invention. A lever 2' of this finder has engaging notches "a", "b" and "c" for engaging with a latch 11. When the latch 11 engages with the notch "a", the field switch frames 5A and 5B conceal the upper and lower edges of the standard field frame 1. When the latch 11 engages with the notch "b", the standard field frame 1 remains unconcealed. When the latch 11 engages with the notch "c", the field switch frames 5A and 5B conceal the right and left edges of the standard field frame 1. Thus, the use of this latch allows an aspect ratio of the visual field of the finder to be changed stepwise. Although the latch engages with the lever in this embodiment, this latch may be arranged to engage with the driving wheel.

Figure 6:
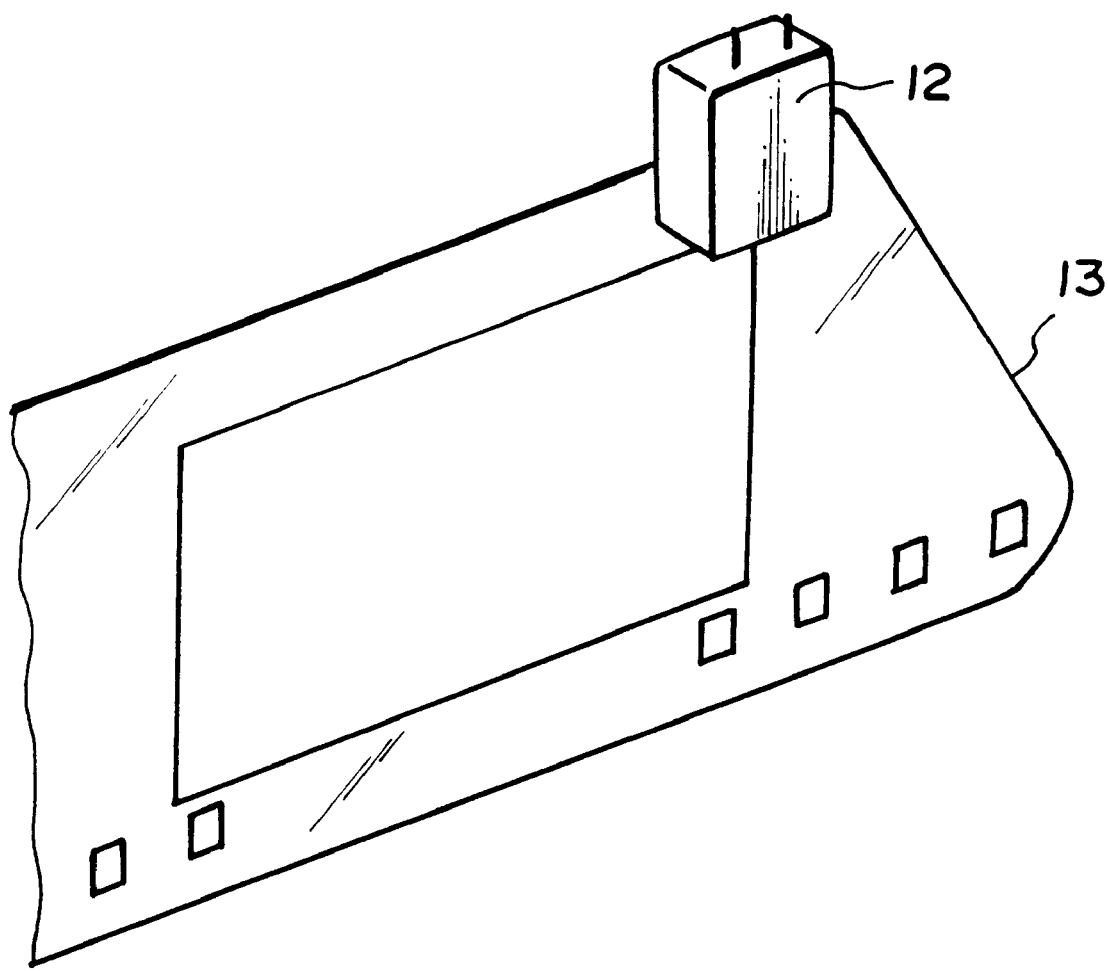
FIG. 6 is a schematic representation showing the recording of aspect ratios on a film by means of a magnetic recording device.

As diagrammatically illustrated in FIG. 6, information about aspect ratios can be recorded on a film by means of a magnetic recording device, whereby the aspect ratio defined when a picture was acquired can be obtained when the picture is printed.

Thus, according to the present invention, it becomes possible to obtain a field frame for use with a finder which is simple in structure, and can switch its aspect ratio arbitrarily or stepwise.

As will be apparent from the description above, the present invention can be embodied in various ways and the embodiments described may be modified into various forms.

What is claimed is:

1. A field frame comprising:

a reference field frame with its center arranged in line with an optical axis;

two L-shaped field switch means which are movably arranged opposite to each other with respect to the optical axis;

a driving means for displacing said L-shaped field switch means relatively to each other so that the combination of said L-shaped field switch means can produce a rectangular space by the inner-angles of said L-shaped field switch means, whereupon a part of the visual field of said reference field frame is laterally or longitudinally concealed by the presence of said rectangular space, whereby an aspect ratio of said field frame can be changed;

each of said L-shaped field switch means having a dowel pin and two elongated holes; the main body of said reference field frame having two dowel pins; and said L-shaped field switch means being superposed on each other on said reference field frame in such a manner that said elongated holes are superposed and said dowel pins of said reference field frame are disposed in the superposed elongated holes;

said elongated holes being disposed in the ends of legs of said L-shaped field switch means, said legs having inner edges that meet at the juncture of said legs, said inner edges bounding said visual field.

2. A field frame as defined in claim 1, wherein said driving means is a wheel having one notched lever and two engaging cut-outs which engage said dowel pins of said L-shaped field switch means, and said field frame further includes a latch which engages one of a plurality of engaging notches formed on said notched lever, so that the engagement of said latch with one of said notches can cause said L-shaped field switch means to longitudinally or laterally conceal a part of the visual field of said reference frame, whereby the aspect ratio of said field frame can be changed stepwise.

3. A field frame as defined in claim 1, further including a magnetic recording means for recording information about aspect ratios on a film, so that an aspect ratio determined when a picture was acquired can be obtained when the picture is printed.

4. A field frame comprising:

a reference field frame with its center arranged in line with an optical axis;

two L-shaped field switch means which are movably arranged opposite to each other with respect to the optical axis;

a driving means for displacing said L-shaped field switch means relatively to each other so that the combination of said L-shaped field switch means can produce a rectangular space by the inner-angles of said L-shaped field switch means, whereupon a part of the visual field of said reference field frame is laterally or longitudinally concealed by the presence of said rectangular space, whereby an aspect ratio of said field frame can be changed;

each of said L-shaped field switch means having a dowel pin and two elongated holes; the main body of said reference field frame having two dowel pins; and said L-shaped field switch means being superposed on each other on said reference field frame in such a manner that said elongated holes are superposed and said dowel pins of said reference field frame are disposed in the superposed elongated holes;

said driving means being a wheel having one lever and two engaging cutouts which engage said dowel pins of said L-shaped field switch means to move said L-shaped field switch means upon rotation of said wheel, said wheel having an outer circular border having at opposite sides of said wheel pairs of outwardly extending legs between each of which pairs a said cutout is defined, said dowel pins of said reference field frame being disposed outside said circular border.

5. A field frame as defined in claim 4, wherein said driving means is a wheel having one notched lever and two engaging cut-outs which engage said dowel pins of said L-shaped field switch means, and said field frame further includes a latch which engages one of a plurality of engaging notches formed on said notched lever, so that the engagement of said latch with one of said notches can cause said L-shaped field switch means to longitudinally or laterally conceal a part of the visual field of said reference frame, whereby the aspect ratio of said field frame can be changed stepwise.

6. A field frame as defined in claim 4, further including a magnetic recording means for recording information about aspect ratios on a film, so that an aspect ratio determined when a picture was acquired can be obtained when the picture is printed.

* * * * *